United States Patent
Calcagno

(10) Patent No.: US 7,650,205 B2
(45) Date of Patent: Jan. 19, 2010

(54) PROCESS FOR CONTROLLING INDUSTRIAL ROBOTS, AND RELATED ROBOTS, SYSTEMS AND COMPUTER PROGRAMS

(75) Inventor: Renzo Calcagno, Grugliasco (IT)

(73) Assignee: Comau S.p.A., Grugliasco (Torino) (IT)

( * ) Notice: Subject to any disclaimer, the term of this patent is extended or adjusted under 35 U.S.C. 154(b) by 653 days.

(21) Appl. No.: 11/405,870

(22) Filed: Apr. 18, 2006

(65) Prior Publication Data

US 2006/0232236 A1    Oct. 19, 2006

(30) Foreign Application Priority Data

Apr. 19, 2005  (EP) .................................. 05425246

(51) Int. Cl.
G05B 19/18    (2006.01)
G05B 15/00    (2006.01)

(52) U.S. Cl. ........................... 700/264; 700/19; 700/20; 700/245; 700/247; 318/568.1; 318/568.11; 318/568.21

(58) Field of Classification Search .................. 701/247, 701/264; 901/49; 700/247, 264, 17, 19, 700/20, 160, 245, 248, 255; 318/568.1, 568.21, 318/587; 345/169; 379/90.01; 382/141
See application file for complete search history.

(56) References Cited

U.S. PATENT DOCUMENTS

| 6,560,513 | B2 | 5/2003 | Krause et al. | |
| 6,697,681 | B1 * | 2/2004 | Stoddard et al. | 700/17 |
| 6,711,713 | B1 * | 3/2004 | Rumpler et al. | 714/820 |
| 6,717,382 | B2 * | 4/2004 | Graiger et al. | 318/587 |
| 2004/0068335 | A1 * | 4/2004 | Ferla et al. | 700/86 |
| 2004/0148058 | A1 * | 7/2004 | Johannessen et al. | 700/245 |
| 2004/0260426 | A1 * | 12/2004 | Johannessen et al. | 700/245 |
| 2007/0250212 | A1 * | 10/2007 | Halloran et al. | 700/245 |

FOREIGN PATENT DOCUMENTS

| WO | WO 02/078913 A1 | 10/2002 |
| WO | WO 02/078914 A1 | 10/2002 |
| WO | WO 02/078915 A1 | 10/2002 |

OTHER PUBLICATIONS

European Search Report for Application No. 05425246.5.

* cited by examiner

Primary Examiner—Khoi Tran
Assistant Examiner—Dale Moyer
(74) Attorney, Agent, or Firm—Young Basile

(57) ABSTRACT

An industrial robot includes a manipulator (1) having a control unit (2) and a portable terminal (3), the unit and the terminal being able to communicate in wireless mode for executing a robot programming session. The unit (2) and the terminal (3) are configured so as to implement a step of mutual logic coupling, which is required so as to enable the programming session, only when the terminal (3) is in a substantially predefined physical position (5) close to the unit (2).

25 Claims, 7 Drawing Sheets

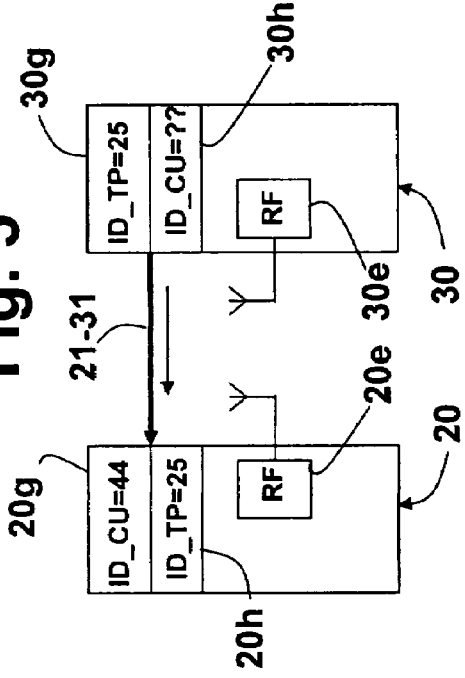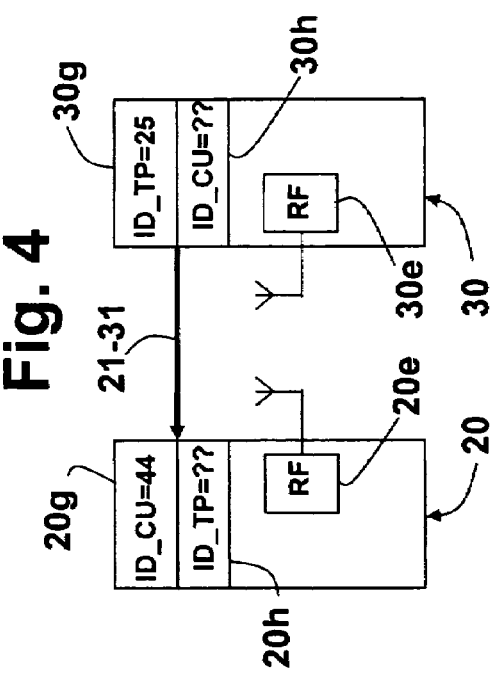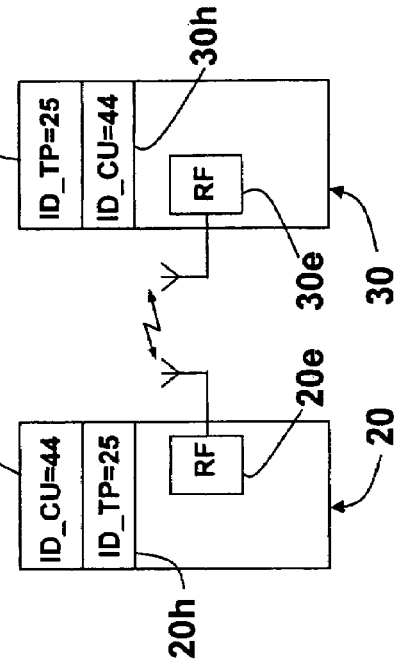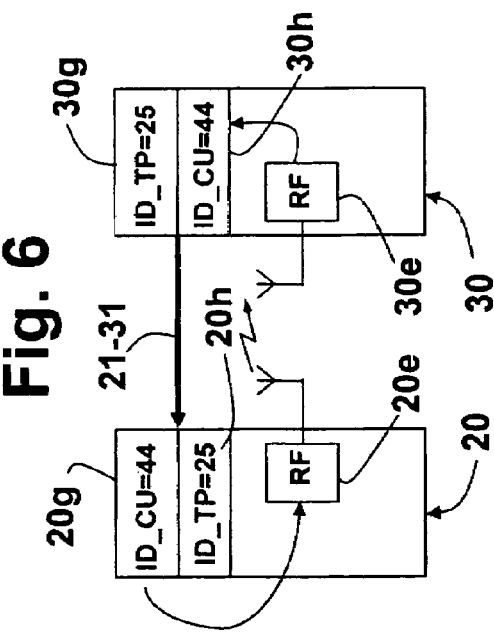

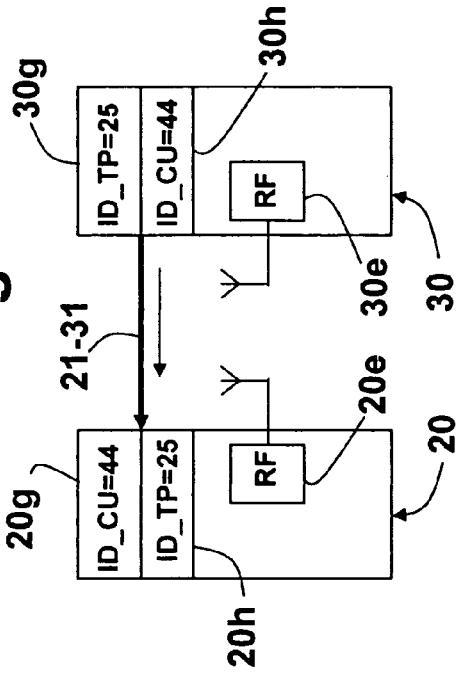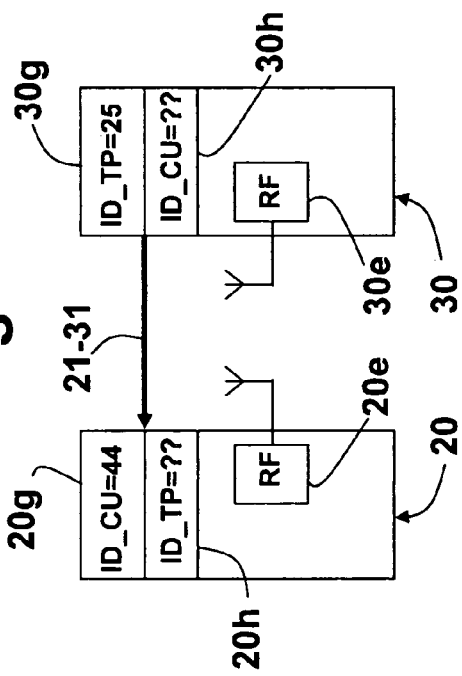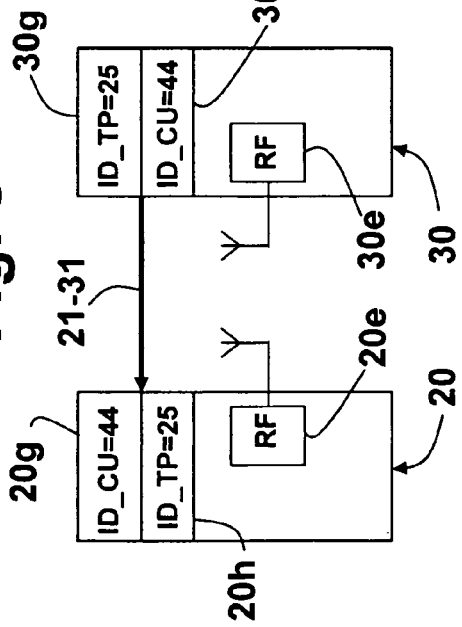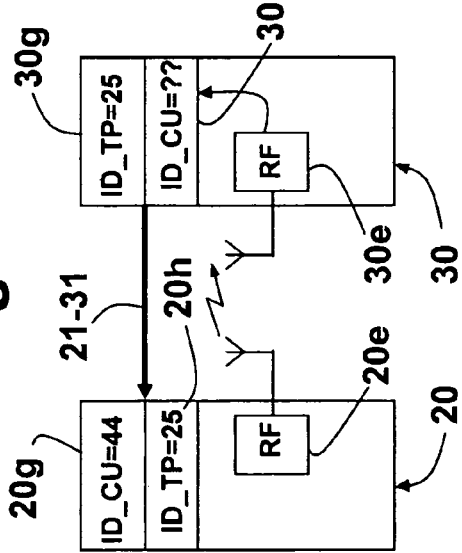

PROCESS FOR CONTROLLING INDUSTRIAL ROBOTS, AND RELATED ROBOTS, SYSTEMS AND COMPUTER PROGRAMS

BACKGROUND OF THE INVENTION

The present invention relates to industrial robots and was conceived in particular for the possible application of robots with a portable terminal associated therewith and designed to communicate in wireless mode with the robot control unit.

"Wireless" refers here to a communication involving a wireless communication of signals by means of electromagnetic waves, preferably by radio-frequency but possibly also by means of ultrasounds or infrared radiations or radiations in another frequency field.

Programming a robot basically means teaching said robot the trajectory which a point of its manipulator should repeat automatically during normal operating steps in order to execute a given operation. A robot can thus operate at least in an automatic and in a manual mode, which can usually be selected on the robot control unit. When manual mode is selected, for instance for programming or "teaching" a robot, the respective manipulator can be handled through instructions sent by a portable terminal; conversely, when automatic operation mode is selected, the motion of the manipulator is subject only to the control unit.

Most of the programming time is for manually controlling the robot, so as to identify the optimal points of the motion trajectories of the manipulator and store the coordinates thereof. To this purpose the aforesaid portable programming terminal is used, also known as teach pendant, which is operatively connected to the robot control unit and typically comprises a display and a series of pushbuttons used for programming and manually controlling the robot. The teach pendant can also be used for monitoring the robot program, for checking machine statuses, for modifying certain program parameters and so on.

In some solutions the terminal is connected to the control unit by means of a cable having such a length as to enable the operator to move near the working area of the manipulator and accurately check related points and trajectories. The aforesaid cable enables a limited controllability for the operator in his/her programming activity, since s/he should move continuously near the manipulator; another drawback consists in that the cable can get caught or entangled with other cables and should thus be freed. Moreover, the cable is subject to wear and tear and damages and therefore needs to be repaired or replaced. In order to solve such drawbacks it has been suggested to operatively connect the portable terminal to the control unit in wireless mode.

The operating environment in which a robot performs its functions, known as "cell", has different configurations depending on the system layout and can contain one manipulator or more manipulators operating coordinately, each manipulator being equipped with its control unit. The use of wireless data exchange technology has a further advantage consisting in that one teach pendant can be used for controlling in manual mode each of the robots of a cell independently so as to program the latter. However, when one of the robots of a cell has to be placed under the manual control of a wireless teach pendant, it is extremely important to establish a definite univocal connection between the teach pendant and the robot to be controlled, so as to avoid possible dangers for the programming operator.

WO 02/078913 describes a system comprising a plurality of robots and a terminal that can communicate with a given robot of said plurality; to this purpose, the control unit of each robot is equipped with a stop pushbutton configured as a removable module, and the terminal is designed to receive said module in a suitable seat. The module comprises memory means containing a code identifying the related control unit; on the other side, the terminal comprises means for reading from said memory means of the module the code identifying the control unit. Knowing said code, the terminal can communicate only with the unit from which the module has been taken, so as to control manually the related manipulator.

The solution mentioned above complicates to a certain extent the implementation of the portable terminal, which should be equipped with a suitable seat and with related means of physical interconnection for the removable module; removable modules are further subject to frequent handlings, which might engender confusions as well as damages and a rapid wear and tear of their contacts, with subsequent risks of bad working.

SUMMARY OF THE INVENTION

In the light of the above, the present invention aims at implementing an industrial robot as previously referred to, ensuring an improved level of safety as far as programming activity is concerned, and whose manufacture is simple, cheap and reliable. The invention further aims at implementing a robot as previously referred to which enables an easy and versatile activity involving programming and manual control by means of a portable terminal, however under fully safe conditions.

These and other aims, which will be clear in the following, are achieved according to the invention by a process, an industrial robot, a robot system and a computer product having the features listed in the appended claims, which are an integral and substantial part of the description of the present patent application.

BRIEF DESCRIPTION OF THE DRAWINGS

Further aims, characteristics and advantages of the invention will be evident from the following description and from the accompanying drawings, given as mere illustrative and non-limiting example, in which:

FIGS. 4-7 are schematic representations of the steps of a logic coupling procedure between the control unit and the terminal of FIG. 3;

FIGS. 8-11 are schematic representations of the steps of a logic decoupling procedure between the control unit and the terminal of FIG. 3;

DETAILED DESCRIPTION

Figure 1:
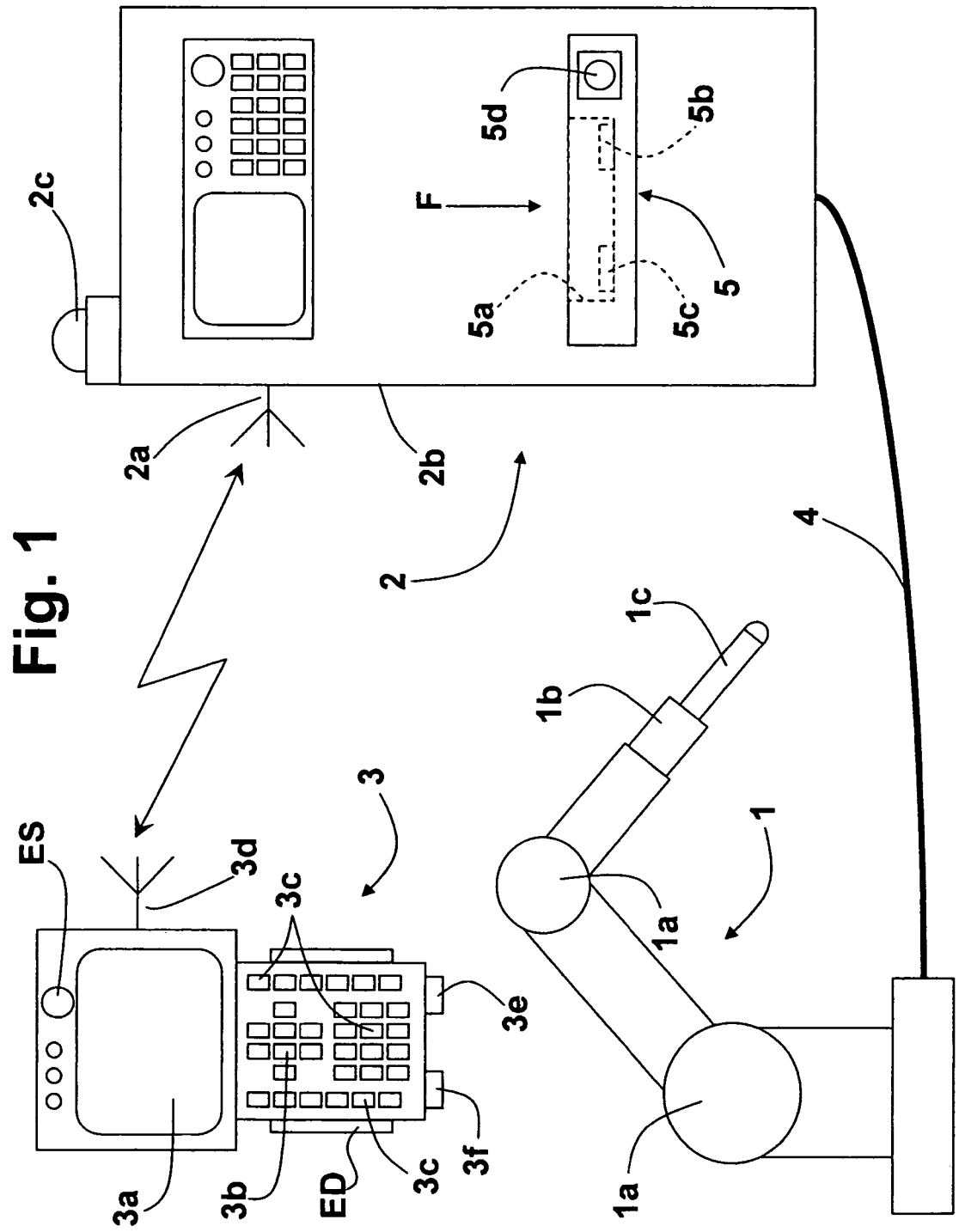
FIG. 1 schematically shows a robot as described here, comprising a manipulator, a control unit of the manipulator and a portable programming terminal.

FIG. 1 shows an industrial robot comprising a manipulator 1, a control unit 2 and a portable programming terminal or teach pendant 3. The manipulator 1 has a plurality of parts moving according to respective axes, articulated by means of joints 1*a*, and an end wrist 1*b* carrying a generic tool 1*c*. The manipulator 1 is connected by means of a cable 4 to its control unit 2. The terminal 3 comprises at least a display 3*a*, by means of which machine statuses, programming steps, possible alarms and various parameters, such as the position of the axes of the manipulator, can be monitored; the display 3*a* is used both when programming the positions of the axes and the steps of a movement program and as remote monitor for the unit 2;

a group of keys for controlling the motion of the axes of the manipulator 1, some of which are referred to with 3*b*; the keys of said groups comprise in particular those for selecting the desired motion reference system and those for controlling motion, known as "jog" keys;

a group of programming and editing keys, some of which are schematically referred to with 3*c*, used for surfing inside programs shown on the display 3*b*, for activating various functions and for inputting data.

The terminal 3 further comprises an emergency stop device, referred to with ES, which can consist of a mushroom pushbutton, placed in fixed position on the front panel of said terminal; pressing said pushbutton enables to immediately stop/deactivate the motion of the manipulator 1 and/or of the whole operating cell in which the robot operates. The teach pendant is also equipped with an enabling device, referred to with ED, which should be used together with the keys of the group 3*c* during the teaching steps or the steps of manual control of the motion of the manipulator 1; in practice, the enabling device ED should be kept active by the operator, so as to enable the manipulator 1 to make the desired movements during the programming step. In the non-limiting example of FIG. 1, the device ED comprises two keys extending on the lateral edges of the terminal 3, but in another possible embodiment the device can be located in the rear portion of the terminal, as described for instance in document EP-A-1 405 700.

The unit 2 and the terminal 3 are configured so as to communicate with each other in wireless mode, and to this purpose they are equipped with means for exchanging signals by air, comprising respective antennae 2*a* and 3*d*. Said means are sized so as to have a useful range of a few meters and therefore to be inside the field of action of terminal 3 with respect to the unit 2. Air transmission of signals can occur according to any known technique; in the preferred embodiment of the invention, wireless communication between unit 2 and terminal 3 takes place by radio-frequency, using the transmission system defined by standard IEEE 802.111 (which is wholly referred to for further details), known as Wi-fi system.

The wireless connection between the terminal 3 and the unit 2 basically enables the exchange of the three following types of information:

a) operating data, such as information concerning axis position, motion or jog instructions and in general all selections that can be made by means of the terminal 3, as well as software download from said terminal to the unit 2; also the unit 2 can send data to the terminal 3, such as information required for updating windows on the display 3*a*, indication codes (alarms, machine statuses, and so on), program upload, and so on;

b) status of the emergency stop device ES;

c) status of the enabling device ED.

The terminal 3 further comprises an electric connector 3*e* belonging to a recharging arrangement of an internal battery of said terminal, and a port for data transfer 3*f*, which is supposed to be near the connector of a serial communication port. In the disclosed non-limiting example, the connector 3*e* and the port 3*f* are positioned on the lower edge of the terminal 3.

According to a first aspect of the invention, in order to allocate or couple univocally the terminal 3 and the control unit 2, the first one should be first positioned near the second one, or more generally in a predefined position. To this purpose, in the preferred embodiment of the invention, the unit 2 is provided with a positioning support 5 for the terminal 3, defined in the following as Docking Station; advantageously, the Docking Station 5 is configured so as to be used also for recharging an internal battery of the terminal 3.

The Docking Station 5 is preferably connected physically to the cabinet or stationary frame 2*b* of the unit 2, and for simplicity's sake, in the example it is configured as a sort of shelf defining a seat 5*a* open upwards; the lower portion of the terminal 3 can be inserted into the seat 5*a* in the direction of arrow F of FIG. 1. An electric connector 5*b* and a connector or port for data transfer 5*c*, which are complementary to connectors 3*e* and to port 3*f*, are fastened onto the bottom of said seat 5*a*. The insertion of the lower portion of the terminal 3 into the seat 5*a* results in the coupling or connection both between the connectors 3*e* and 5*b* and between the connectors or ports 3*f* and 5*c*.

The Docking Station is further equipped with a control element, such as a pushbutton 5*d*, used for starting a logic coupling-decoupling procedure between the terminal 3 and the unit 2, which is a further independent aspect of the present invention to be protected.

Still in FIG. 1, eventually, 2*c* refers to a signaling lamp indicating an interoperating condition between the unit 2 and the terminal 3.

Figure 2:
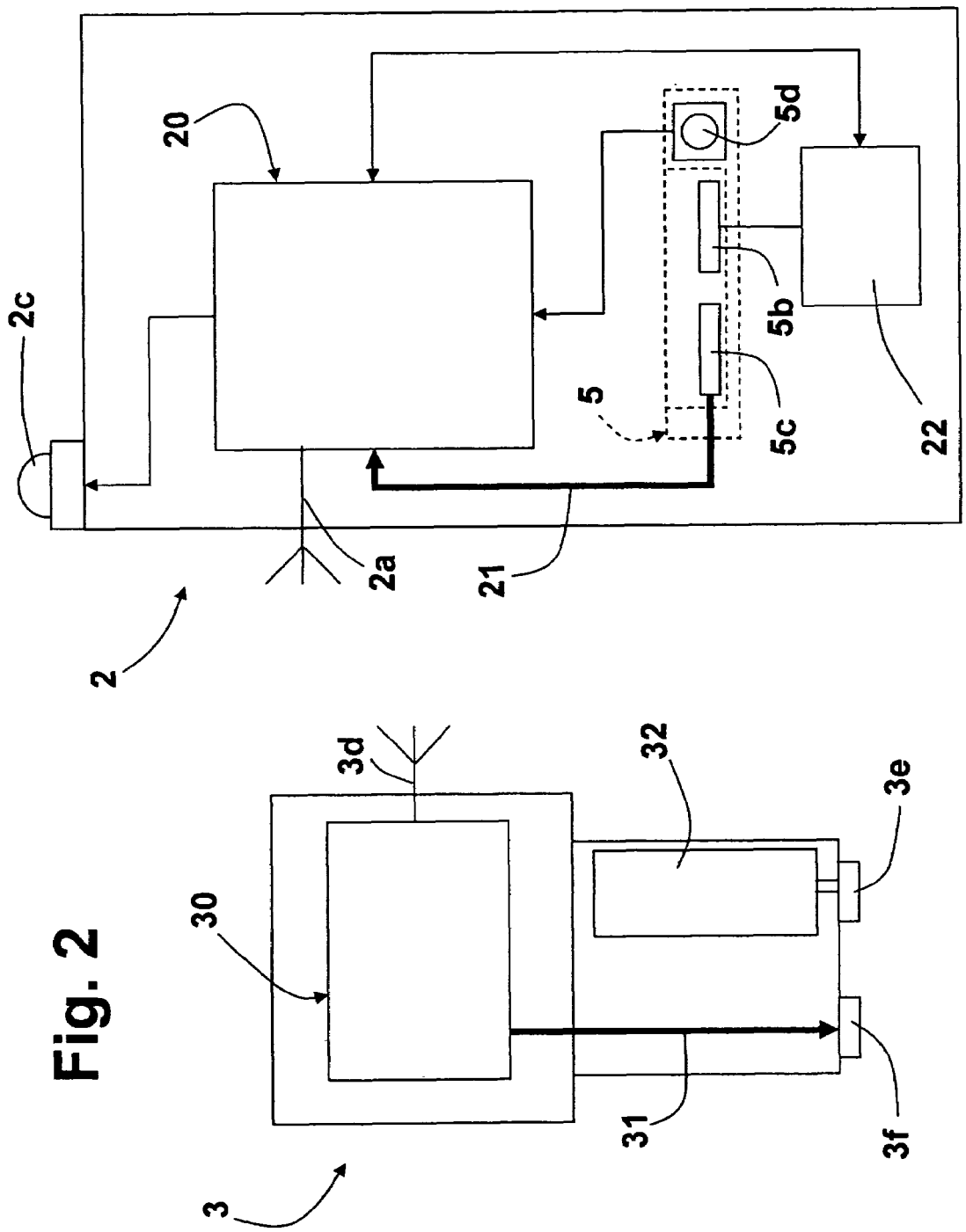
FIG. 2 shows a simplified block diagram of the control unit and of the terminal of the robot of FIG. 1.

In FIG. 2 the unit 2 and the terminal 3 are represented by means of simplified block diagrams.

The terminal 3 comprises a corresponding electronic control system, globally referred to with 30, for managing all the various functions of said terminal. The system 30 can send and receive data or information through the antenna 3*d* and it is further configured so as to enable data and information transfer through a further data communication line, here a physical or cable line, such as a serial unidirectional line, referred to with 31, connected to the port 3*f*. Number 32 refers to an autonomous supply source of the terminal, such as a rechargeable battery known per se, whose poles are connected to the contacts of the connector 3*e*.

The unit 2 comprises a corresponding electronic control system, globally referred to with 20, for managing all the various functions of said unit. The system 20 is configured so as to send and receive data or information through the antenna 2*a*; the system 20 is also configured so as to enable data and information transfer through a further data communication line, here a physical or cabled line, such as a serial unidirectional line, referred to with 21, connected to the port 5*c* of the Docking Station 5.

Number 22 refers to a recharging circuit, known per se, controlled by the system 20 and connected to the connector 5*b* of the Docking Station. The system 20 is further configured so as to control the operation of the lamp 2*c*, as well as to receive a control signal from the pushbutton 5*d*.

In order to enable the use of the terminal 3 for programming the robot, both the unit 2 and the terminal 3 are equipped with a corresponding univocal identifying code ID. Each ID code is preferably made up of two parts, represented by an IP network address (but it could be a MAC address) and by a series number SN. Thus:

$$ID\_CU = IP\_CU + SN\_CU$$

$$ID\_TP = IP\_TP + SN\_TP$$

where

ID_CU and ID_TP refer to the identifying codes of the unit 2 and of the terminal 3, respectively;

IP_CU and SN_CU refer to the IP address and to the univocal series number SN of the unit 2, respectively;

IP_TP and SN_TP refer to the IP address and to the univocal series number SN of the terminal 3, respectively.

For simplicity's sake and referring to the accompanying figures, let us suppose that IP_CU and IP_TP addresses are 4 and 2, that SN_CU and SN_TP series numbers are 4 and 5, and that, therefore, ID_CU and ID_TP identifying codes are 44 and 25, respectively.

IP addresses can be modified depending on the various needs, in ways that are not described here since they are known per se and do not fall within the scope of the present invention; to this purpose, IP addresses can be stored on rewritable permanent memories, such as Flash or EEPROM memories. Preferably, series numbers SN cannot be modified, and to this purpose they can be written by the manufacturer of the unit 2 and/or of the terminal 3 during manufacturing and/or test steps on permanent read-only memories, such as ROM memories. The identifying code ID is built by the control system of the unit 2 and of the terminal 3 after their switching on, and stored in a rewritable memory, for instance a RAM, Flash or EEPROM memory.

Figure 3:
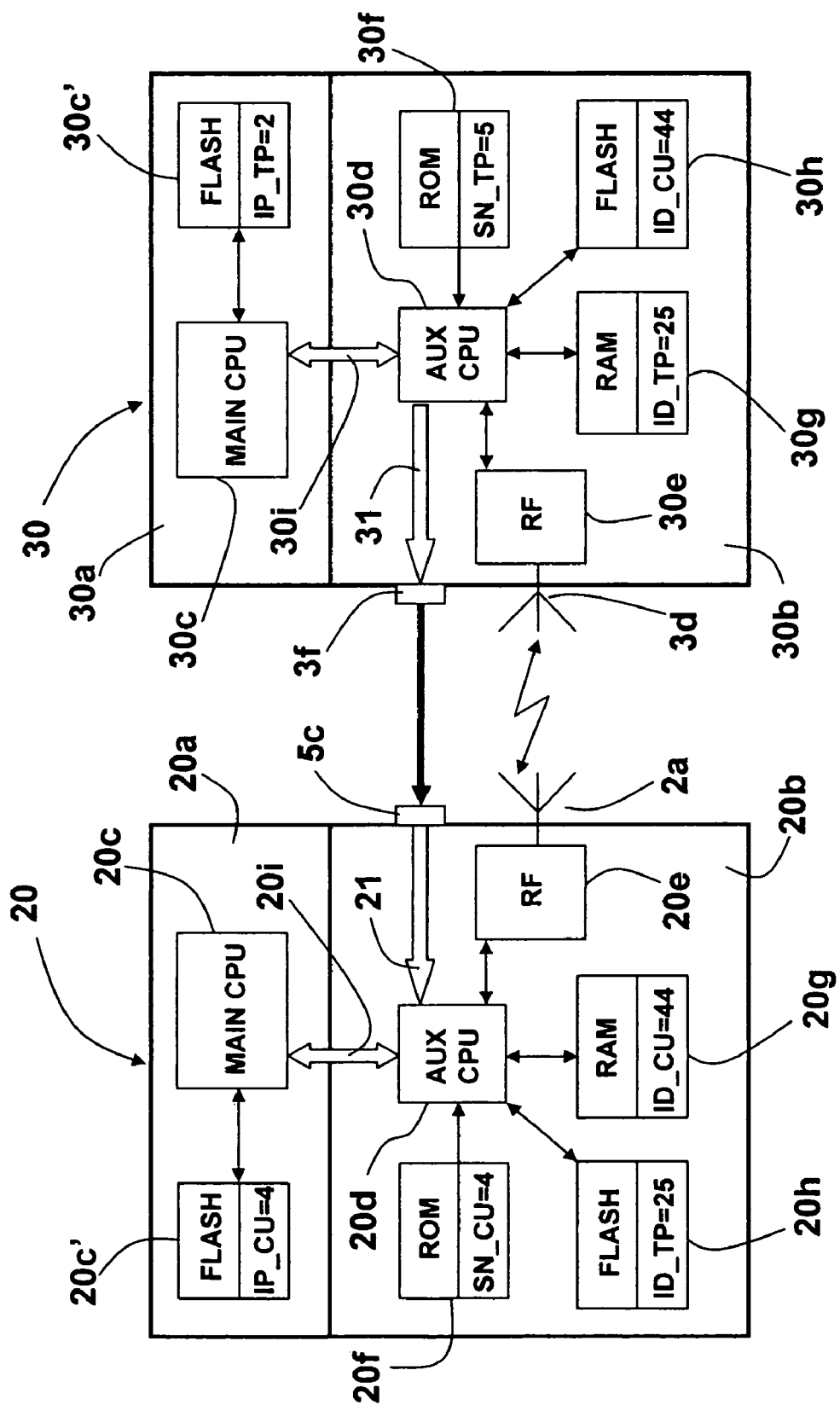
FIG. 3 shows a simplified block diagram of a part of the control systems of the unit and of the terminal of FIG. 2.

FIG. 3 shows with a block diagram the control systems 20 and 30 of the unit 2 and of the terminal 3, though only those parts thereof that are useful for understanding the aforesaid first aspect of the invention.

The control system 20 comprises a main module 20*a* and an auxiliary module 20*b*, the first one being designed to manage the typical functions of the unit 2 and the second one being designed specifically to manage data transfer with outside. The module 20*a* comprises a main processor 20*c* operatively associated to a Flash memory 20*c'*, in which the IP_CU address of the unit 2 is coded; as was said, the processor 20*c* can modify the content of the memory 20*c'*, if necessary. The module 20*b* comprises an auxiliary processor 20*d* for controlling a circuit 20*e* for wireless data exchange, including the antenna 2*a*; the processor 20*d* can also receive or read external data or information through the serial line 21, connected to the port 5*c* of the Docking Station 5 (see also FIG. 2). The processor 20*d* is operatively associated with a ROM memory 20*f*, a RAM memory 20*g* and a Flash memory 20*h*. The series number SN_CU of the unit 2 is coded permanently in the read-only memory 20*f*, whereas the temporary memory 20*g* is designed to retain the identifying code ID_CU of the unit 2; conversely, the rewritable memory 20*h* is designed to retain the identifying code ID_TP of the terminal 3. The main 20*c* and auxiliary processor 20*d* communicate with each other by means of a bus 20*i* of the unit 2, such as a CAN bus.

Also the control system 30 comprises a main module 30*a* and an auxiliary module 30*b*, the first one being designed to manage the typical functions of the terminal 3 and the second one being designed to manage data transfer with outside. The module 30*a* comprises a main processor 30*c* operatively associated to a Flash memory 30*c'*, in which the IP_TP address of the terminal 3 is coded and can be modified if necessary. The module 30*b* comprises an auxiliary processor 30*d* for controlling a circuit 30*e* for data exchange by air, including the antenna 3*d*; the processor 30*d* can also send data or information or allow these to be read from outside through the serial line 21, connected to the port or connector 3*f* of the terminal 3 (see also FIG. 2). Here too, the processor 30*d* is operatively associated with a ROM memory 30*f*, a RAM memory 30*g* and a Flash memory 30*h*. The series number SN_TP of the terminal 3 is coded permanently in the read-only memory 30*f*, whereas the temporary memory 30*g* contains the identifying code ID_TP of the terminal 3; conversely, the rewritable memory 30*h* is designed to contain the identifying code ID_CU of the unit 2. The main 30*c* and auxiliary processor 30*d* communicate with each other by means of a bi-directional serial line 30*i*.

As was already mentioned, when switching on the unit 2, the control system 20 builds the code ID_CU by means of the two processors 20*c*, 20*d* and of the memories 20*c'*, 20*f*, which code is stored in the memory 20*g* until said unit is switched off; analogously, when switching on the terminal 3, the control system 30 builds the code ID_TP by means of the two processors 30*c*, 30*d* and of the memories 30*c'*, 30*f*, said code being stored in the memory 30*g* until said terminal is switched off. The memories 20*g* and 30*g* could, if necessary, be replaced by rewritable permanent memories, such as Flash or EEPROM memories, for containing ID codes also after the devices 2, 3 are switched off.

According to the first relevant aspect of the solution described here, the univocal connection between the terminal 3 and the unit 2—which is required to enable the use of said terminal for programming the robot—is implemented by means of a suitable procedure; in the embodiment described here, said procedure, in the following also defined as "logic coupling" procedure, presupposes that the terminal 3 is positioned on the Docking Station 5 of the unit 2; the coupling of the terminal with a given control unit therefore requires a physical closeness of the two devices.

FIGS. 4-7 show schematically a possible logic coupling procedure between the unit 2 and the terminal 3.

FIG. 4 shows the situation in which the switched-on terminal 3 is placed on the Docking Station 5. Under such circumstances, as was explained, a "physical" connection is established between the control systems 20, 30 of the unit 3 and of the terminal 3 by means of the connectors or ports 3*f* and 5*c*. By pressing the pushbutton 5*d* of the Docking Station 5 an operator starts the coupling procedure; in the initial step of said procedure the control system 20 checks by means of suitable sensor means the actual presence of the terminal 3 on the Docking Station 5 (this can be obtained by using for instance a current sensor belonging to the recharging circuit 22 of FIG. 3).

FIG. 5 shows the following step in which, after the confirmation of the presence of the terminal 3, the control system 20 reads the content of the memory 30*g* of the control system 30, i.e. the identifying code ID_TP of the terminal 3; this is carried out (see also FIG. 3) by means of the auxiliary processors 20*d* and 30*d*, connected through the serial lines 21, 31 and the ports 3*f*, 5*c*. The result of said reading is then stored by the processor 20*d* in a predefined register of the memory 20*h*, if said register is free, or compared with the content thereof, if already occupied (such a register can be the one referred to with R0 in FIG. 13). The fact that the aforesaid register of the memory 20*h* is free means that the terminal 3 is not coupled at present with any unit 2, whereas the condition in which the memory register 20*h* is already occupied means that the terminal 3 is already coupled with a control unit. In practice, the three following situations can occur:

a) if the aforesaid register of the memory 20*h* is free, the operator is correctly trying to establish a logic coupling procedure between the unit 2 on whose Docking Station 5 the terminal is now positioned;

b) if the ID_TP code read is the same as the one stored in the aforesaid register of the memory 20*h*, the operator is correctly trying to establish a logic decoupling procedure, as will be described in further detail below;

c) if the ID_TP code read differs from the one stored in the aforesaid register of the memory 20*h*, the operator is incorrectly trying to establish a coupling procedure with a terminal already coupled with another unit, or s/he is incorrectly trying to establish a decoupling procedure on the Docking Station of a control unit differing from the one with which the terminal is currently coupled (which is not allowed, as will be discussed below).

In cases b) and c) the unit 2 emits a suitable error signal; in case a), conversely, the coupling procedure can go on to the next step, shown in FIG. 6.

During said step, after memorizing the ID_TP code the control system 20 of the unit 2 communicates its own identifying code ID_CU to the control system 30 of the terminal 3, which in the meanwhile switches to a waiting status. To this purpose (see also FIG. 3) the processor 20d reads the content of the memory 20g and transmits the related information in wireless mode together with a coupling instruction by means of the circuit 20e (said transmission can occur thanks to the fact that the system 20 now knows the "identity" of the terminal 3); on the other hand, the coupling instruction with the ID_CU address is received by means of the circuit 30e by the processor 30d, which then stores the related information in a predefined register of the memory 30h, which is free at present. Preferably, said procedure ends with a wireless exchange between the unit 2 and the terminal 3 of information confirming that the logic coupling has occurred.

Now, as shown by way of example in FIG. 7, the unit 2 and the terminal 3 are coupled with each other, i.e. each of them knows the identifying code ID of the other one, and are therefore enabled to operate in the robot programming mode, in which the terminal 3 can transmit in wireless mode the instructions of motion of the manipulator 1 as well as the required status information concerning the safety devices (i.e. emergency stop device ES and enabling device ED).

As can be inferred, in case of systems comprising several robots, the units in which the aforesaid register of the memory 20g is free will not be enabled to allow manual motion of the respective manipulators.

The result of the coupling procedure can be made explicit in any way, for instance by means of a visual indication with a suitable lamp or with a display of the unit 2 and/or of the terminal 3.

In the system described here, ID codes are univocal addresses required for information exchange between the unit 2 and the terminal 3, or better absolutely necessary for enabling the use of the terminal for programming or teaching the robot. Therefore, in the preferred case of data packet transmission from the terminal 3 to the unit 2 during robot programming, the header of a transmitted packet will contain the ID_CU code, whereas the information content of said packet (payload) will concern the transmitted information (about for instance an instruction of motion of the manipulator 1, status information of the emergency stop device, status information of the enabling device). In other words, therefore, any programming and/or motion information, in order to be identified and executed by the unit 2, should be contained in a data packet identified by the ID_CU code.

On the other hand, in case of transmission from the unit 2 to the terminal 3, the header of a transmitted packet can contain the ID_TP code (but it could also be the address IP_TP), and the information content of said packet will concern the transmitted information (such as an alarm or a machine status, data for updating a window on the display 3, and so on).

Wireless channels are continuously tested—in a way known per se—through polling procedures on unit 2 and terminal 3 sides with a rate varying depending on the activity of the processor managing communication.

When the terminal 3 should be used together with a "new" unit 2 (i.e. a unit differing from the one with which the terminal is coupled at present), a decoupling procedure should be executed, as was already mentioned above. In the preferred embodiment of the invention, said procedure should be carried out on the Docking Station 5 of the unit 2 with which the terminal 3 is already coupled; once said decoupling procedure is over, the terminal 3 can be inserted onto the Docking Station 5 of the other unit 2, so as to execute efficiently the corresponding logic coupling procedure.

FIGS. 8-11 show schematically a possible logic decoupling procedure between the unit 2 and the terminal 3.

FIG. 8 shows the situation in which the terminal 3, switched on, is on the Docking Station 5, i.e. in a condition as the one of FIG. 4. The decoupling procedure is started by pressing the pushbutton 5d of the Docking Station 5; here again, in the initial step of the procedure, the actual presence of the terminal 3 on the Docking Station 5 is checked, as was already described above.

FIG. 9 shows the following step in which, after receiving the confirmation of the presence of the terminal 3, the control system 20 reads the content of the memory 30g of the control system 30, i.e. the identifying code ID_TP of the terminal 3, basically as was already described above, through a serial connection. The data resulting from the aforesaid reading is compared by the processor 20d with the content of the aforesaid predefined register of the memory 20h. If the read ID_TP code differs from the one contained in said register, the decoupling procedure is interrupted and a suitable indication is emitted, for instance a visual or acoustic indication, for the operator; the lack of identity between the codes clearly means that the operator is trying to carry out the procedure on a unit 2 other than the one currently allotted to the terminal 3. Conversely, in case of correspondence between the two data (read ID_TP and stored ID_TP), the procedure goes on, as shown in FIG. 10.

During this step the processor 20d sends to the control system 30 of the terminal 3—which in the meanwhile has switched to a waiting status—a decoupling instruction or an instruction of deletion of the content of the memory 30h (see also FIG. 3). Said instruction is transmitted by the processor 20d in wireless mode by means of the circuit 20e; the information concerning the instruction is received by means of the circuit 30e by the processor 30d, which after sending a suitable confirmation to the unit 2 in wireless mode deletes the memory 30h. Upon reception of said confirmation, the processor 20d of the control system 20 of the unit 2 deletes the content of its memory 20h.

Now the unit 2 and the terminal 3 are decoupled, i.e. the contents of the memories 20h and 30h of their control systems 20, 30 are free, as shown by way of example in FIG. 11; under these circumstances, the terminal 3 is no longer enabled to send the unit 2 instructions of motion of the corresponding manipulator 1. Here again, the result of the procedure can be made explicit in any way.

The unit 2 and the terminal 3 are obviously equipped with respective software programs for executing the procedures described with reference to FIGS. 4-7 and 8-11, said programs being implemented with any technique and known language.

As was explained in the introduction of the present description, a cell can comprise both a manipulator and several manipulators, each being equipped with its control unit 2. In case of a system comprising several robots, the terminal 3 described above can be used either in a "point-to-point" mode or in a "multipoint" mode.

In the first case the terminal 3 can communicate only with the control unit 2 associated with it. In this configuration of use the terminal 3 is provided with the full data transmission/ reception and programming functions; the operator can thus enter the protected operating area of the manipulator for "teaching" the robot, under these circumstances the safety devices between the terminal 3 and the control unit (emergency stop device ES and enabling device ED) being active. The allocation and connection between the terminal 3 and the corresponding unit 2 takes place by means of the dedicated coupling procedure described above, by positioning said terminal on the Docking Station 5 of the concerned unit 2. Under these circumstances, an evident visual indication enables the operator using the terminal 3 to identify the active connection, i.e. the unit 2 which the terminal is currently coupled with. To this purpose a suitable indication can be provided on the display 3a of the terminal 3, on which the "name" of the connected control unit 2 will be displayed; means for signaling the connection are also provided on the control unit 2, in this example the lamp 2c, which will be on continuously for indicating the active connection with the terminal 3. The lamp 2c will have such size, color and position as to be well visible (for instance amber color and placed on top of the unit 2 or on its control panel or on the Docking Station 5). Note that as an alternative or in addition to the case just described, a lamp 2c can also be mounted onto the manipulator 1 or near the latter.

In case of "multipoint" mode in accordance with a second independent aspect of the invention to be protected, the terminal 3 can be simultaneously connected with at least two control units 2 in different modes, and in particular with a so-called "main" or exclusive connection and with at least one so-called "secondary" connection. Such a case is shown schematically by way of example in FIG. 12, where a generic cell C contains four different robots, referred to with X, Y, W and Z, each having a manipulator 1x, 1y, 1w, 1z with its control unit 2x, 2y, 2w, 2z equipped with its Docking Station 5x, 5y, 5w, 5z and its lamp 2cx, 2cy, 2cw, 2cz. As is evident, the cell is gone through by an advance line L on which two operating stations are present, one being made up of the robots X and Y and the other one of the robots W and Z, the robots of each pair being arranged in a basically symmetrical position with respect to both sides of the line L.

In the example, the robot X basically corresponds to the robot of FIG. 1, whose unit 2x is characterized by the codes IP=4 and SN=4 (and therefore with a code ID_CU=44) as in the example described above; conversely, the codes of the other robots are the following: unit 2y: IP=5, SN=8; unit 2w: IP=6, SN=7; unit 2z: IP=7, SN=2.

In the situation shown above, the terminal 3 has a main connection with the robot X and a secondary connection with the robot W. The status of main connection with the robot X—referred to in the figure by the arrow "Main"—basically corresponds to the "point-to-point" mode described above, so that a complete connection is established between the terminal 3 and the unit 2x, safety devices being active and being thus possible to control manually the manipulator 1x to programming purposes.

The status of secondary connection with the robot W—represented in the figure by the arrow "Secondary"—enables to use the same terminal 3 also for monitoring or remote data exchange functions with respect to the unit 2w (machine status check, current program steps, alarms if present, data download between terminal and control unit and/or vice versa, update of display windows, and so on), though without the possibility of programming or controlling the motion of the corresponding manipulator 1w: this because in the secondary connection emergency channels (i.e. those related to the statuses of the safety device ES and enabling device ED) are not active, said channels being active only in the main connection towards the unit 2x.

The allocation and connection between the terminal 3 and the unit 2x for the main connection should always take place by means of the dedicated procedure described above, by using the Docking Station 5x of the unit 2x. Conversely, the allocation and connection between the terminal 3 and the unit 2w (and the subsequent deactivation of the connection) takes place by means of a software procedure that does not require the terminal to be positioned on the Docking Station 5w.

The indication of the main connection to the operator belongs to the case of "point-to-point" connection and can therefore be implemented by means of the display 3a of the terminal 3 and the lamp 2cx of the unit 2x, which is steadily on. As far as indications of the secondary connection are concerned, on one hand the display 3a of the terminal 3 will show a suitable additional window with the "name" of the unit 2w having a secondary connection; on the other hand, on the unit 2w the lamp 2cw will be blinking, thus indicating the status of secondary connection with the terminal 3.

Figure 12:
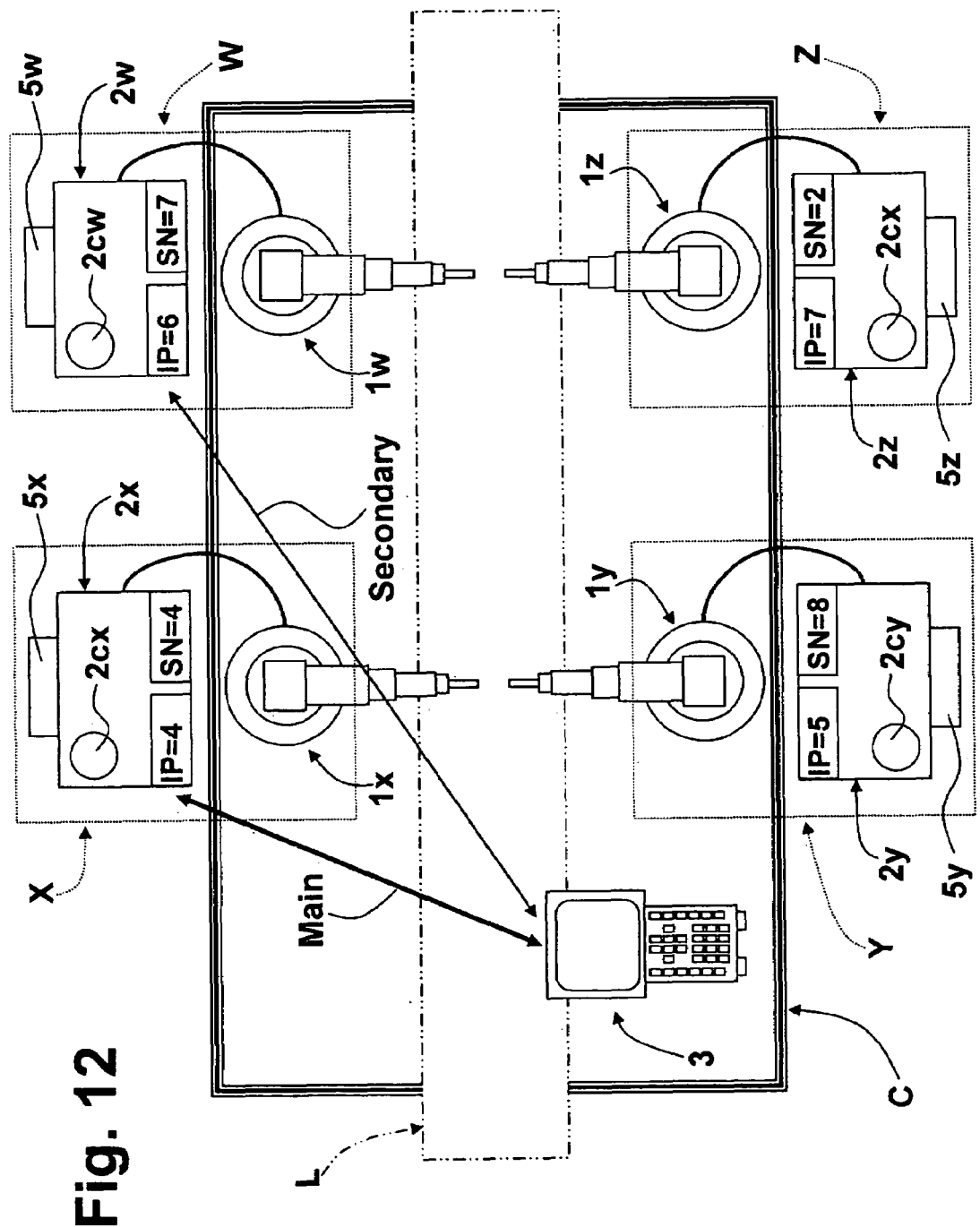
FIG. 12 is a schematic representation of a working cell comprising a robot system as described here.
Figure 13:
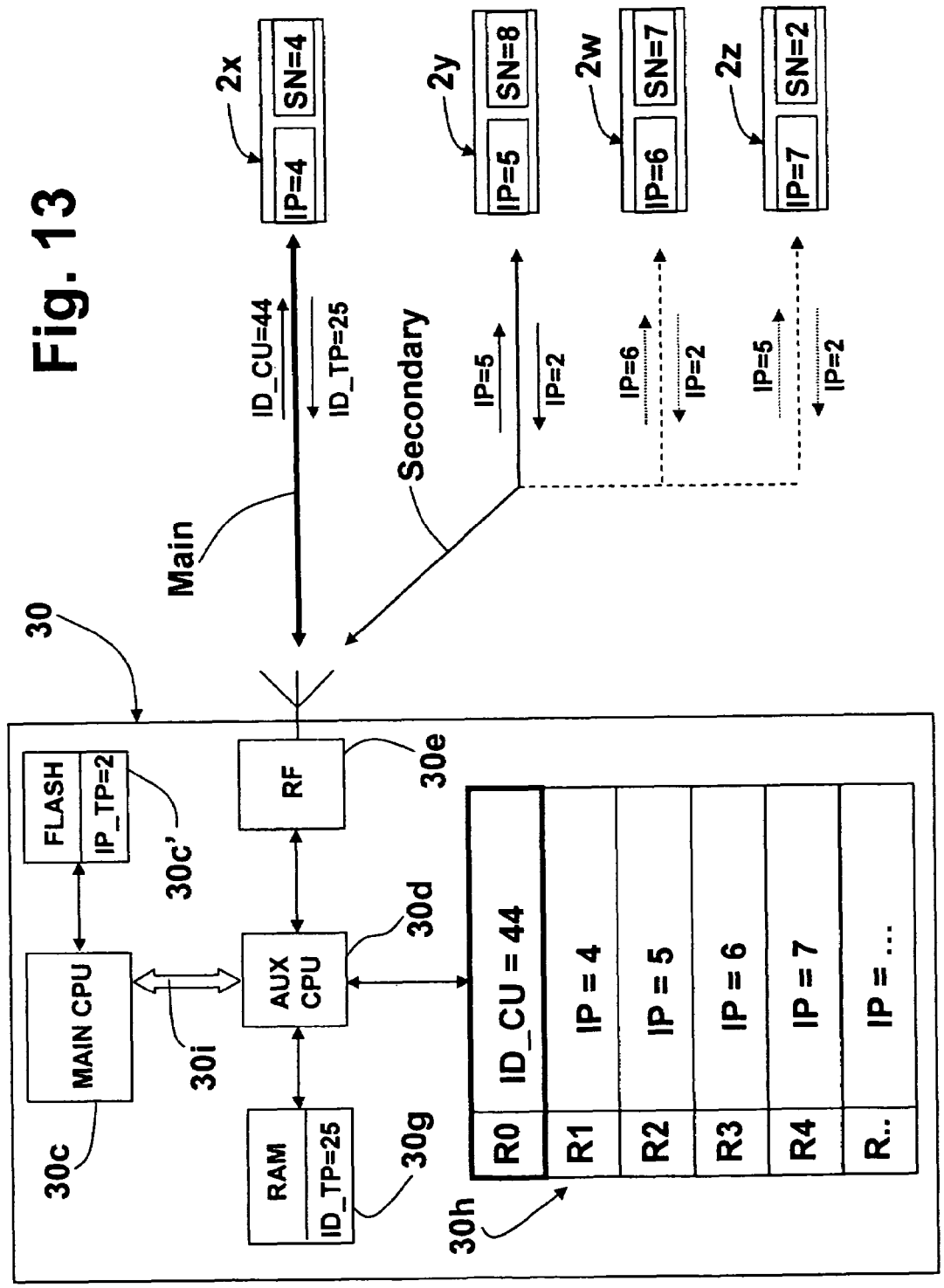
FIG. 13 is a simplified block diagram disclosing a possible use of a terminal used in the robot system of FIG. 12.

FIG. 13 shows a possible way to implement the "multipoint" connecting function as described above with reference to FIG. 12; in said FIG. 13 only some components of the control system 30 of the terminal 3 are shown, already described with reference to FIG. 3; conversely, the control units 2x, 2y, 2w and 2z of FIG. 12 are shown schematically, with the indication of their IP addresses and series numbers SN.

As shown by way of example in FIG. 13, the rewritable memory 30h of the control system 30 of the terminal 3 comprises a plurality of registers, some of which being referred to with R0, R1, R2, R3, R4; one of said registers, in the case shown by way of example the one referred to with R0, is specifically designed to store the identifying code ID_CU of the control unit which the terminal 3 is coupled with for the main connection or to programming purposes; said storage occurs—as was explained—thanks to the special procedure described with reference to FIGS. 3 and 4-7.

The other registers R1, R2, R3 and R4, conversely, are designed to contain respective addresses of secondary connection of the units 2x, 2y, 2w and 2z; in the example shown said addresses consist of the IP addresses of the aforesaid units.

In a possible embodiment, IP addresses of the units 2x, 2y, 2w and 2z can be pre-stored in the registers R1-R4, for instance upon installation of the cell C with its robots; in such a case, therefore, the IP addresses of the units which the terminal 3 is meant to be able to establish a secondary connection 3 with are inserted into the terminal 3 designed to be used together with a given cell (but it could also be with a plurality of cells, placed for instance on the same manufacturing line). The storage of said addresses can be carried out through a simple software procedure directly on the terminal 3, using its display 3a and its keys 3c, and it is not necessarily a permanent storage; as was mentioned, it may happen that the IP address of each control unit (contained in the corresponding memory 20c of FIG. 3) must be modified in time, for instance as a result of changes made in time to the cell C; as a consequence, also the content of the registers R1-R4 of the memory 30h of FIG. 13 can be modified when necessary.

As an alternative, the allocation of the secondary connection between the terminal 3 and at least one unit 2x, 2y, 2w and 2z can occur through a radio communication channel, with a variable and dynamic occupation of the registers R1-R4 of the memory 30h.

In a first possible embodiment of this type, the units 2x-2z making up the cell C are programmed so as to declare periodically their IP address in wireless mode; in other words, therefore, the control systems of said units emit at regular intervals by means of their respective circuit 20*f* (see FIG. 3 and its description) a signal containing the IP address information. On the other hand, the control system 30 of the terminal 3 is configured so as to switch periodically to a waiting status for receiving said signals; the terminal 3 and the units 2*x*-2*z* can be suitably programmed so that the interval with which said terminal switches to a waiting status is a multiple of the interval with which the units emit their address signals.

After the respective circuit 30*e* has received the aforesaid signals, the control system 30 of the terminal 3 stores the various IP addresses thus received in the registers R1-R . . . in sequential order. Obviously, the auxiliary processor 30*d* compares the IP addresses periodically received with those that might already be stored in the addresses R1-R . . . , so as to avoid a double storage of the same information.

In accordance with another possible embodiment, the terminal 3 can conversely be configured so as to "summon" for the secondary connection the units 2*x*-2*z* that might be available in the network. In said situation, therefore, automatically or as a result of a specific instruction entered by the operator on the terminal 3, the control system 30 of the latter emits cyclically for a given lapse of time and by means of the circuit 30*e* a query signal, i.e. an invitation to the resources available in the network to "introduce themselves", and then switches to a response waiting status; after receiving said query signal through the respective circuits 20*e*, the control units available in the network transmit through said circuits 20*e* their IP address signals, which the terminal 3 receives and then stores in the registers R1-R4, basically in the same way as described above. Obviously, in this embodiment the control systems of the units 2*x*-2*z* will cyclically switch to a waiting status for receiving the aforesaid query signal; the terminal 3 and the units 2*x*-2*z* can be programmed, if necessary, so that the interval with which said units switch to a waiting status is a sub-multiple of the lapse of time during which the terminal emits cyclically the query signal; on the other hand, the response waiting time for the terminal 3—after the emission of a query signal—can be a multiple of the interval imposed to the units for emitting their address signals.

The system can be conceived so that at least one secondary connection can be enabled only if the terminal 3 already has a main connection, i.e. it is logically coupled with one of the control units; the system can further be configured so that the control unit that already has a main connection with the terminal 3 (in the example of FIG. 13 unit 2*x*) does not communicate its IP address for the storage in one of the registers R1-R . . . of the memory 30*h*, since it is unnecessary.

If required, the control systems 2*x*-2*z* can be configured so as to communicate to the terminal 3, beside their IP address, also further identifying information enabling the operator a visual identification of the various units, whatever the status of the lamps 2*cx*-2*cz*, i.e. also before the secondary connection is established. For instance, referring to the example of FIG. 12-13, the various units 2*x*-2*z* and/or their manipulators 1*x*-1*z* can be equipped in a well visible position with a plate indicating a robot name in alphabetical, numeric or alphanumeric characters; with reference to the example of FIGS. 12-13, said name can be made up of the series number SN, and therefore "4", "8", "7" and "2" for robots X, Y, W and Z, respectively. By sending the aforesaid additional identifying information and by storing the latter in a suitable memory thanks to the control system 30, the terminal 3 can associate each IP address also with a "label" of the corresponding robot, so as to show it on the display 3*a*. Thus, a selection window can be activated on the display 3*a*, so as to display the list of labels of the units which can establish a secondary connection with the terminal 3; after visual identification in the cell C (through the corresponding plate) of the robot with which the secondary connection should be established, the operator can select the corresponding label by means of the aforesaid window and thanks to the keyboard of the terminal 3. As a result of said selection, the status of "Secondary" connection will be shown on the control unit 2*w* (in the example of FIG. 12-13) by blinking of the corresponding lamp 2*cw*; the display 3*a* of the terminal 3, conversely, will show a dialog window containing, beside the label of the robot W, the various options allowed by the secondary connection; as was said, said options refer basically to the possible remote monitoring of the unit 2*w* and to the exchange of data and information differing from programming/motion data and information of the manipulator 1*w*, which are not allowed by the secondary connection.

At any time, the operator using the terminal 3 can activate a different secondary connection by simply recalling on the display 3*a* the aforesaid display window and choosing from the corresponding list the label of another robot; said possibility is shown by way of example by the hatched arrows of FIG. 13.

As was mentioned before, also the status of "Main" connection with the unit 2*x* is shown on the terminal 3 through a suitable dialog window on the display 3*a*, containing, beside the name of the robot X, the various options allowed in said type of connection; on the unit 2*x* the "Main" connection will be shown by the lamp 2*cx* being continuously on.

Obviously, the software which the terminal 3 is equipped with is provided with suitable menus or functions for selecting the windows to be shown on the display 3*a*, and it is therefore possible to switch between the connection windows "Main" and "Secondary".

From the previous description it can be inferred that, according to the first aspect of the invention as described, in order to enable a robot for programming/motion functions, the portable terminal 3 should be placed in a given position with respect to the control unit 2, so as to start a suitable logic coupling procedure. Preferably, said coupling can be obtained only as a result of the physical approach between said two devices, and in particular after placing the terminal 3 in a suitable support 5 belonging to the unit 2; thus, the operator that should use the terminal 3 is indeed forced to pre-identify visually which one of the robots present in the working area C can be moved manually. The use to programming purposes of a terminal 3 together with a unit 2 differing from the one which said terminal is coupled with then presupposes a specific decoupling procedure; as was discussed, said procedure should anyhow be carried out in the unit 2 which the terminal 3 was already coupled with. The need to execute manually coupling and decoupling operations increases the operator's awareness, thus reducing possible confusions and resulting risks.

The fact that, in a preferred though not exclusive embodiment, the exchange of the ID codes between the terminal 3 and the unit 2 takes place using two different communication lines (serial connection and wireless connection) increases intrinsically the safety of the coupling operation; the fact that the coupling procedure can end only after a correct radio feedback between the unit 2 and the terminal 3 allows to get a confirmation on the correctness and operativeness of the wireless connection, before the terminal is actually used for programming the predefined robot.

The proposed solution does not make the implementation of the terminal 3 particularly difficult, since it involves at most only the addition of some internal electronic components (if they are not already present) and of an auxiliary communication line for transferring the identifying code ID_TP (moreover, in case of use of power line communication—as explained below—the port $3f$ and the serial line 31 can be omitted); the absence of a dedicated seat for a removable module, as provided for in WO 02/078913, simplifies the layout of the terminal, which can thus be compact and light.

On the other hand, the unit 2 is equipped with a support or seat with some elementary and/or standard contacts, in which the terminal should be placed. A wireless terminal necessarily includes a battery, preferably a rechargeable battery; advantageously, therefore, means that should in any case be present so as to recharge the terminal battery can be exploited, in the preferred embodiment of the invention, for integrating also part of the means enabling to couple logically the terminal and the control unit with one another.

The possibility of a "multipoint" connection according to the second aspect of the invention is on the other hand extremely advantageous as far as the practical use of the terminal is concerned.

As was mentioned in the introduction to the present description, a robot can operate in an automatic operation mode. In said mode and with reference to the example of FIG. 12, the robots X-Z execute their operating programs inside the cell C, which the personnel cannot enter but is under the visual control of an operator. Under these circumstances, the portable terminal 3 can be placed—as occurs typically—in a stationary position near the cell C, though the emergency stop pushbutton ES being active, by means of which the operator can stop the robot X and/or—as provided in many cases—the whole cell C, if necessary.

As was explained, according to the first aspect of the invention, the function associated with the pushbutton ES is active only in case of a "Main" connection between a robot and the terminal 3, the latter being allowed, according to the second aspect of the invention, to establish selectively at least also one "Secondary" connection. As can be inferred, thanks to the aforesaid possibility, the operator monitoring the cell C can monitor remotely the control systems of the various robots X-Y by means of the terminal 3 and therefore from only one place, without having to move continuously near each of the units $2x$-$2z$ for checking their machine statuses on their control panels.

The "multipoint" connection mode further enables to simplify the programming activity of systems in which several robots execute basically similar operations.

For instance, as in the case shown by way of example in FIG. 12, a cell C often contains several working stations on the same line L, each station having two robots in opposite positions; in the case shown two stations are present, including robots X-Y and W-Z, respectively. For various manufacturing types, moreover, the two robots of the same station execute automatically identical operations on opposite portions of the same part on the line L, the basic movements of one robot being therefore perfectly symmetrical or inverse with respect to those executed by the other robot. In other words, therefore, the operating program of the first robot differs from the one of the second robot only for a given series of parameters (such as position coordinates of the joints of the manipulator or the direction of movement of its parts, within a given space reference system).

Under these circumstances, after programming the first robot of a station—which is supposed to be here the robot X of FIG. 12—an operator can establish through the terminal 3 a "Main" connection with the second robot of the same station—the robot Y in the example—so as to program the latter. In said condition of main connection with the robot Y, the operator can anyhow establish a "Secondary" connection with the unit $2x$, which has already been programmed, so as to download onto the terminal 3 the corresponding operating program; once said program has been obtained, the operator can go back to the programming mode allowed by the "Main" connection, so as to modify the aforesaid parameters of the program previously downloaded and thus adapt it to the robot Y.

Obviously, a man skilled in art can implement several variants of the industrial robot and of the robot system described by way of example, although without leaving the novelty framework of the inventive concept.

Logic coupling and decoupling procedures could be started, instead with the key $5d$, by means of an instruction given by the terminal 3, provided the latter has been previously positioned on the Docking Station 5 of the concerned unit 2. In this case, after starting the procedure, the control system 30 of the terminal can communicate its own code ID_TP to the control system 20 of the unit 2 by means of the serial connection made up of the components previously referred to with 31, $3f$, $3c$ and 21 (if necessary, the terminal 3 could read the code ID_CU of the system 20, and the coupling/decoupling procedure could take place inversely with respect to the one described previously, managed by the system 30).

In possible differing embodiments, the connection due to the positioning of the terminal 3 near the unit 2 can be obtained with different means with respect to a cabled serial line, and in particular with a connection without physical or dedicated contacts. For instance, the information concerning at least one ID code could be transferred using RFID technology, with at least one tag associated with the terminal 3 and at least one corresponding tag reader associated with the unit 2 and/or with its manipulator 1; in said application, the components of the RFID system are preferably sized so as to have a useful range of few centimeters, so that the information can be transferred only when the terminal 3 is positioned on the Docking Station 5 or close to the unit 2 and/or to the manipulator 1. Another possibility involves the use of an infrared interface, i.e. with an optical connection established between the unit 2 and the terminal 3 only when the latter is inserted into the Docking Station 5 or in a predefined position with respect to the unit 2 and/or to the manipulator 1. Still another possibility is to implement a serial line by power line communication, the information transfer therefore occurring by exploiting the same electrical connection line establishing between the recharging circuit 22 and the battery 32 of the terminal 3, when the latter is positioned on the Docking Station 5.

Still aiming at increasing the operators' awareness, the Docking Station 5 or the means replacing it for the coupling/decoupling procedure (such as the aforesaid RFID or infrared system) could be placed near the manipulator 1.

What is claimed is:

1. A method for controlling by means of a portable terminal, an industrial robot comprising a manipulator and a manipulator control unit, the method comprising:

providing the terminal and the manipulator control unit with a respective electronic control system, the control systems having respective first communication means for establishing a wireless main connection between said manipulator control unit and terminal, the main connection being used during a session of use of the terminal for transmitting to the manipulator control unit information concerning at least one of programming instructions and instructions of motion of the manipulator, and status conditions of a safety device (ES, EN) which the terminal is equipped with;

providing the control systems of the manipulator control unit and the terminal with respective identity information (ID_CU, ID_TP);

enabling said session of use through executing a coupling step of the terminal with the manipulator control unit, wherein the identity information (ID_TP) of the terminal control system is made available to the manipulator control unit control system and the identity information (ID_CU) of the manipulator control unit control s stern is made available to the terminal control system;

wherein, during said coupling step, said main connection is used for making available to one of the control systems of said terminal and manipulator control unit the identity information (ID_TP) of the control system of the other one of said terminal and manipulator control unit;

the method further comprising providing the control systems of the terminal and the manipulator control unit with respective second communication means, said second communication means being adapted to establish an auxiliary connection between the terminal and the manipulator control unit for executing of said coupling step, wherein said auxiliary connection can be established only when the terminal is placed in a substantially predefined position with respect to one of the manipulator and the manipulator control unit;

using, during execution of said coupling step, said auxiliary connection for making available to the control system of said other one of said terminal and manipulator control unit the identity information (ID_CU) of the control system of said one of said terminal and manipulator control unit;

using, once said coupling step has ended and during said session of use, the terminal for transmitting to the manipulator control unit, via said main connection, said information concerning at least one of programming instructions and instructions of motion of the manipulator, and status conditions of said safety device (ES, EN), after interruption of said auxiliary connection subsequent to a removal of the terminal from said substantially predefined position.

2. The method according to claim 1, wherein said auxiliary connection is interrupted upon removing the terminal from said substantially predefined position, once said coupling step has ended.

3. The method according to claim 1, wherein the step of executing said coupling step further comprises the steps of:
receiving the identity information (ID_TP) of the controls system of the terminal by the control system of the manipulator control unit and, then, transmitting the identity information (ID_CU) of the control system of the manipulator control unit by the control system of the manipulator control unit to the control system of the terminal.

4. The method according to claim 3, wherein the step of executing said coupling step further comprises the steps of the control system of the manipulator control unit checking whether a predetermined storage register is free and
in the positive case, the control system of the manipulator control unit memorizes in said predetermined storage register the identity information of the control system of the terminal and then transmits to the control system of the terminal the identity information of the control system of the manipulator control unit,
in the negative case, the control system of the manipulator control unit compares the identity information of the control system of the terminal (ID_TP) with a content of said predetermined storage register.

5. The method according to claim 4, wherein
if the identity information (ID_TP) of the control system of the terminal is compatible with the content of said predetermined storage register, enabling execution of a decoupling step between said terminal and manipulator control unit;
if the identity information (ID_TP) of the control system of the terminal is not compatible with the content of said predetermined storage register, interrupting the coupling step.

6. The method according to claim 3 further comprising the step of,
the control system of the manipulator control unit retaining in a predetermined storage register the identity information (ID_TP) of the control system of the terminal, and
the control system of the terminal retaining in a predetermined storage register the identity information (ID_CU) of the control system of the manipulator control unit.

7. The method according to claim 1, further comprising:
executing a decoupling step of said terminal with respect to said manipulator control unit, so as to disable said session of use.

8. The method according to claim 7, further comprising the step of using, said auxiliary connection by the control systems of the manipulator control unit and the terminal for executing said decoupling step.

9. The method according to claim 6, further comprising:
executing a decoupling step of said terminal with respect to said manipulator control unit, for disabling said session of use, wherein the control systems of the manipulator and the terminal are configured for deleting said respective predetermined storage registers during said decoupling step.

10. The method according to claim 1, wherein the control systems of the manipulator control unit and the terminal are configured for exchanging with each other, during said coupling step and through said main connection, information confirming execution of said coupling step.

11. The method according to claim 1, further comprising:
providing a visual indication, both on the terminal and on the manipulator, of an enabled condition of said session of use.

12. The method according to claim 1, wherein said identity information (ID_CU, ID_TP) of the control systems are each obtained by transferring at least one of two identifying codes (IP, SN) between the manipulator control unit and the terminal, wherein one of the two codes can be modified and the other one cannot.

13. An industrial robot system comprising at least one industrial robot, including a manipulator, and a manipulator control unit, and a portable terminal, said manipulator control unit and terminal having each an electronic control system comprising respective first communication devices for establishing a wireless main connection, the main connection being used during session of use of the terminal for transmitting from the control system of the terminal to the control system of the manipulator control unit information concerning at least one of programming instructions, and instructions of motion of the manipulator, and status conditions of a safety device (ES, EN) which the terminal is equipped with,
wherein the control systems of the manipulator control unit and the terminal have respective identity information (ID_CU, ID_TP) and are configured for executing a coupling step, required for enabling said session of use, by which coupling step the identity information (ID_TP)

of the control system of the terminal is made available to the control system of the manipulator control unit and the identity information (ID_CU) of the control system of the manipulator control unit is made available to the control system of the terminal, wherein said first communication devices are adapted, during said coupling step, to make available to the control system of one of said terminal and manipulator control unit the identity information (ID_TP) of the control system of the other one of said terminal and manipulator control unit, and wherein the control systems of the manipulator control unit and of the terminal further comprise:

respective second communication devices configured for establishing an auxiliary connection when the terminal is in a substantially predefined position close to one of said manipulator and manipulator control unit;

respective controllers configured for using said auxiliary connection during said coupling step, for making available to the control system of said other one of said terminal and manipulator control unit the identity information (ID_CU) of the control system of said one of said terminal and manipulator control unit;

said controllers being also adapted to allow, through said main connection and during said session of use, transmission of said information concerning at least one of programming instructions, and instructions of motion of the manipulator, and status conditions of said safety device (ES, EN) after interruption of said auxiliary connection subsequent to a removal of the terminal from said substantially predefined position.

14. The robot system according to claim 13, wherein the controllers of the control systems of the manipulator control unit and of the terminal comprise respective first storage areas containing the respective identity information (ID_CU, ID_TP), the controllers of the control system of the manipulator control unit comprise means for making available or communicate the identity information of the first storage area to the control system of the terminal through one of said main and auxiliary connections, and the controllers of the control system of the terminal comprise means for making available or communicating the identity information of the first storage areas to the control system of the manipulator through the other one of said main and auxiliary connections.

15. The robot system according to claim 14, wherein the controllers of the control system of the manipulator control unit comprise means for reading, through the auxiliary connection, the identity information (ID_TP) of the control system of the terminal and then transmitting to the controllers of the control system of the terminal through the main connection, the identity information (ID_CU) of the control system of the manipulator control unit.

16. The robot system according to claim 14, wherein
the controllers of the control system of the manipulator control unit comprise a second storage area in the manipulator control unit for retaining the identity information (ID_TP) of the control system of the terminal, and the controllers of the control system of the terminal comprise a respective second storage area in the terminal control system means for retaining the identity information (ID_CU) of the control system of the manipulator control unit.

17. The robot system according to claim 16, wherein the controllers of the control system of the manipulator control unit comprise means for checking whether the respective second storage area is free and
in the positive case, to memorize in said second storage area the identity information (ID_TP) of the control s stem of the terminal,
in the negative case, to compare the identity information (ID_TP) of the control system of the terminal with the identity information of said second storage area.

18. The robot system according to claim 13, wherein the controllers of the control systems of the manipulator control unit and of the terminal are configured for implementing, when the terminal is in said substantially predefined position, a decoupling step of said terminal with respect to said manipulator control unit, in order to disable said session of use.

19. The robot system according to claim 16, wherein the controllers of the control systems of the manipulator and of the terminal are configured for
implementing also a decoupling step of said terminal with respect to said manipulator control unit, in order to disable said session of use; and
freeing said respective second storage areas during said decoupling step.

20. The robot system according to claim 13, wherein at least one of the terminal and the manipulator further comprise a visual indicator for signaling an enabled condition of said session of use.

21. The robot system according to claim 13, wherein one of the manipulator and the manipulator control unit is provided with means for defining or identifying said substantially predefined position.

22. The robot system according to claim 21, wherein said means for defining or identifying said substantially predefined position comprise a seat in which at least part of the second communication device of the control system of the manipulator control unit is operative.

23. The robot system according to claim 13, wherein the terminal further comprises a rechargeable battery having a connector, the manipulator control unit comprises a recharging arrangement having a connector engageable with said battery connector when the terminal is in said substantially predefined position.

24. The robot system according to claim 13, wherein said auxiliary connection comprises at least one of
a wired serial connection,
a connection without physical contacts, selected from the group consisting of a short-ray RFID connection, an infrared connection and an optical connection;
a connection based on power line communication, with information transmission implemented by exploiting an electrical connection line established between a battery of the terminal and a recharging circuit of said battery, when the terminal is in said substantially predefined position.

25. A robot system according to claim 13, wherein the at least one robot comprises a plurality of industrial robots, each comprising one said manipulator and one said manipulator control, wherein said portable terminal is usable for selectively programming at least one of the plurality of the industrial robots.

* * * * *